UNITED STATES PATENT OFFICE.

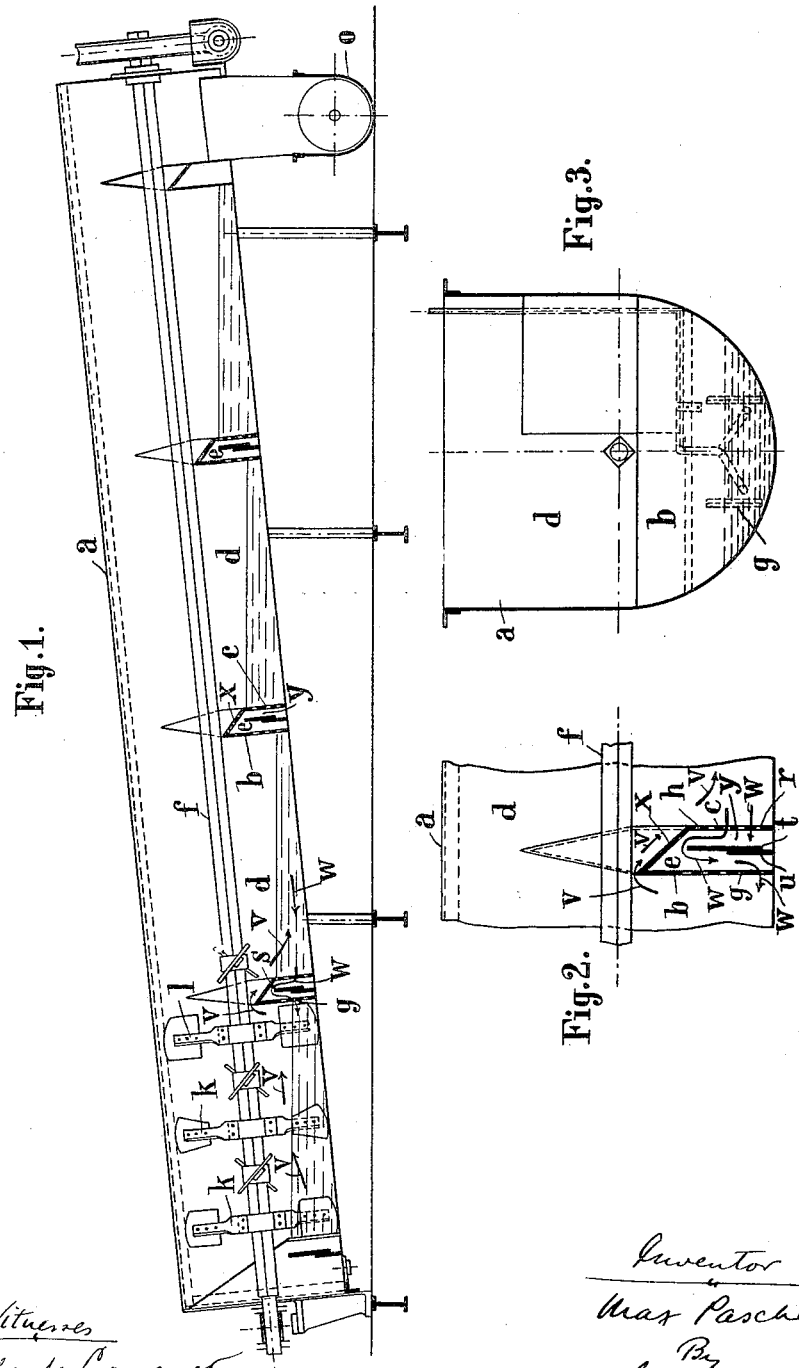

MAX PASCHEN, OF CÖTHEN, GERMANY.

APPARATUS FOR LEACHING SACCHARIFEROUS-VEGETABLE SLICES.

1,134,152. Specification of Letters Patent. Patented Apr. 6, 1915.

Application filed September 18, 1913. Serial No. 790,402.

*To all whom it may concern:*

Be it known that I, MAX PASCHEN, subject of the German Emperor, residing at Schillerstrasse 18, Cöthen, Anhalt, in the German Empire, have invented new and useful Improvements in Apparatus for Leaching Facchariferous-Vegetable Slices, of which the following is a specification.

The present invention relates to an apparatus for leaching sacchariferous vegetable slices according to the patent application Serial Number 725,750. According to the said application a separating chamber is interposed between each two leaching chambers in which juice and slices meet in counter current and are stirred with each other. Into this intermediate, separating chamber the juice enters at the top and passes at the bottom into the next chamber. Thereby a continuous operation in counter current is rendered possible, as, on the one hand, the juice is prevented from flowing too rapidly through the apparatus, which would be the case, if the juice could flow through holes in the bottom of the partitions, and, on the other hand the currents of juice and slices traveling in opposite directions are prevented from disturbing each other at their overflowing point from one chamber into the other, which would necessarily occur, if the same overflow were to be used for both currents. At the same time the juice and slices will, by these separating chambers, be temporarily separated from each other so that a better leaching of the slices results, which is still further improved by the juice being forced by this arrangement to travel through the mass of slices along a longer oblique path. Furthermore the leaching period is essentially abbreviated, a noxious foaming is prevented and a good heat economy is insured owing to the complete exchange of the heat. Furthermore the plant is greatly simplified owing to the absence of pumps for conveying the liquid from one chamber into the other.

With the apparatus after the older patent the separating chamber is formed by two partitions meeting under an angle, the one of which, which is directed toward the current of juice is perforated at the top, so as to allow of the liquid passing through and of retaining the slices. This arrangement, however, showed the disadvantage that the impurities in the juice, such as pulp, sand and the like would deposit in front of the non-perforated lower part of the said partition. This deposit grew continuously and gradually reached the upper perforated part so that the perforations became filled and choked, and the passage of the liquid was obstructed. It also sometimes occurs that the impurities accumulated in front of the partitions, thus within the leaching chamber, were raised by the agitators and conveyed upward in an undesirable manner together with the slices.

According to the present invention these difficulties are met by the overflow for the liquid being covered by means of a roof, beneath which a suitably wide anti-chamber is provided, in which the impurities may deposit. The roof, at the same time, serves as a kind of chute on which the slices can slide, and are more readily than before freed of juice and any adhering impurities. A special advantage may, further, be obtained by the arrangement, that the overflow for the liquid being fitted in form of an intermediate partition into the separating chamber and that the front wall of the separating chamber is perforated at its bottom.

The impurities can then not deposit at the lower perforated end of the wall opposite to the current of the liquid, thus in the leaching chamber itself, because they are washed by the correspondingly higher hydrostatic pressure through the holes into the separating chamber. They will therefore deposit in the separating chamber itself at the foot of the partition damming up the liquid and may be thence removed at intervals or be washed downward by means of gates operated from outside.

In the accompanying drawing the present invention is exemplified in a constructional form.

Figure 1 is a longitudinal section along the middle of the apparatus. Fig. 2 is an enlarged view of a part of Fig. 1. Fig. 3 is a side view of Fig. 2.

The diffusion or leaching apparatus consists of a semi-circular inclined trough $a$, which is divided by partitions $b$, $c$, leaving a part of its section free, into a number of leaching chambers $d$ and separating chambers $e$.

With the older apparatus the partitions $b$ and $c$ meet directly in form of a roof or coping, and the partitions $c$ are perforated in their upper part only at $h$. The lower, non-perforated part serves to dam in the liquid in the next following higher chamber, so that the overflow for the liquid to the next lower chamber was formed by the upper edge of the non-perforated lower part of the partitions c, whereby the hereinbefore stated difficulties were caused.

According to the present invention the partitions b and c are covered by a roof x sloping toward the upper end of the apparatus, which is situated beneath the driving shaft f extending throughout the entire length of the trough. The walls c are perforated along their whole height, thus not only at the top at h but also below at r (Fig. 2), whereas the walls b are only perforated at their bottom at g. Between the walls b and c intermediate partitions s are provided, which have at their lower end cleaning doors t, which are generally closed by gates u. The latter may be opened from any suitable point and by any suitable means and at given intervals, so as to allow of the impurities, sand and the like, which have deposited in front of them in the anti-chambers being washed away.

As in the apparatus forming the subject matter of the principal application the slices which are supplied to the lower end of the trough a are conveyed upward into the several chambers d in the direction of the arrows v by means of the conveyer arms k fitted to the shaft f and having a suitable pitch. For greater simplicity in the drawing these arms have only been shown in the left hand end of Fig. 1. By means of blades l which are considerably wider than the arms k, and which are likewise only shown in the left hand end of Fig. 1, the slices are thrown over the roofs x into the next chamber d. There they are met by the leaching liquid juice or water, which is supplied to the upper end of the trough a. This juice flows in the direction of the arrows w through the perforations in the walls c into the anti-chambers y, is there dammed in by the partitions s and flows over these into the separating chambers e, escaping at the lower end of said chambers e through perforations g in walls b into the next lower chamber, and so on, traveling not only longitudinally to the trough through the mass of slices in the chamber but also diagonally from down up, and being completely separated within the separating chambers e from the slices which are thrown over the latter. The leached slices are removed by a suitable conveyer from the last chamber d at the right hand end of the trough into the tube o, whence they are further conveyed by a conveyer communicating therewith. The juice recovered runs off at the lower end of the trough and is taken to its further treatment.

As will be evident from the foregoing description the overflow for the slices formed by the roof x is arranged above the overflow for the liquid formed by the upper edge of the walls s, and both are separated by the roof x, so that the currents flowing in opposite directions cannot disturb each other at the overflow. The impurities, sand and the like will deposit at the foot of the walls s in the anti-chambers y without being able to choke the perforations at r, so that there is no danger of their being again mixed with the slices agitated by the arms, and carried upward with them, what always was to be feared, when the deposit of the impurities lay within the leaching chambers of the apparatus in which the agitators work. The roof x might also have any other suitable shape other than the one shown in the drawing, and the walls c may also be dispensed with.

What I claim and desire to secure by Letters Patent of the United States is:

1. In a leaching apparatus of the kind described, a trough, walls dividing said trough into a plurality of leaching chambers and intermediate separating chambers, and roofs extending from one wall to another, above said intermediate separating chambers.

2. In a leaching apparatus of the kind described, an inclined trough, walls dividing said trough into a plurality of leaching chambers and intermediate separating chambers, and inclined roofs extending from one wall to another, inclosing said separating chambers.

3. In a leaching apparatus of the kind described, a trough, pairs of walls dividing said trough into a plurality of leaching chambers and intermediate separating chambers, a roof above and connected with each pair of walls, and a partition located between each pair of walls and terminating short of said roof.

4. In a leaching apparatus of the kind described, a plurality of leaching chambers, and a plurality of separating chambers and dirt deposit chambers one of each located between adjoining leaching chambers.

5. In a leaching apparatus of the kind described, a trough, a plurality of walls perforated at their lower portions and disposed in pairs to divide said trough into successive leaching chambers, inclined roofs above said pairs of walls, and intermediate partitions in said chambers located beneath said roofs providing a passage and forming with said partitions a plurality of separating chambers and a plurality of dirt deposit chambers.

6. In a leaching apparatus of the kind described, a trough, and a plurality of combined separating and dirt deposit chambers covered by a common inclined roof dividing said trough into a plurality of leaching chambers.

7. In a leaching apparatus of the kind described, a trough, a plurality of pairs of walls dividing said trough into a plurality of leaching chambers, a roof for each pair of walls overlying intermediate partitions which have openings therein, and means for controlling the openings in said partitions.

8. In a leaching apparatus of the kind described, the combination with a plurality of leaching chambers, of separating chambers alternating with said leaching chambers, and an inclined roof covering each of said separating chambers.

9. In a leaching apparatus of the kind described, a trough, a plurality of walls and roofs forming separating chambers and dividing said trough into a plurality of leaching chambers, some of said walls forming inlets to admit liquid to the upper part of the separating chambers and others having outlets to discharge it at the lower part of said chambers.

10. In a leaching apparatus of the kind described, a trough, a plurality of pairs of walls forming part of separating chambers dividing said trough into a plurality of leaching chambers, and inclined roofs covering the separating chambers.

11. In a leaching apparatus of the kind described, the combination with a plurality of leaching chambers, of walls forming separating chambers, and partitions forming dirt deposit chambers, the walls of the dirt deposit chambers adjacent the leaching chambers being perforated at their lower ends.

12. In a leaching apparatus of the kind described, the combination with a trough of a plurality of walls dividing said trough into a plurality of leaching chambers and dirt deposit chambers, one wall of the dirt deposit chamber adjacent to the succeeding leaching chamber providing an outlet into said leaching chamber in its lower portion.

In testimony whereof I have signed my name to this specification in the presence of two subscribing witnesses.

MAX PASCHEN.

Witnesses:
 WOLDEMAR HAUPT,
 HENRY HASPER.